United States Patent Office

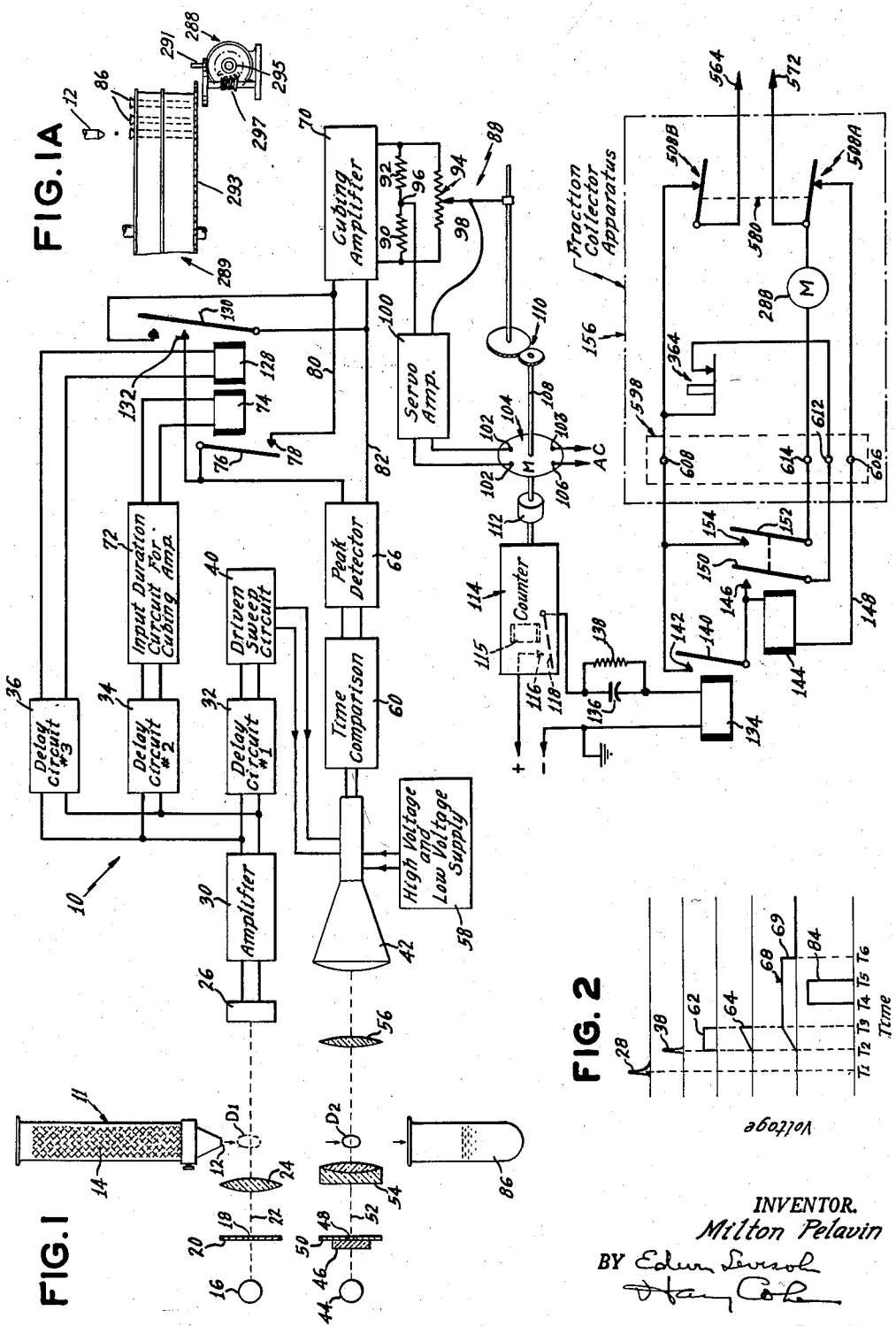

2,880,764
Patented Apr. 7, 1959

2,880,764

DROP VOLUME MEASURING APPARATUS

Milton H. Pelavin, Forest Hills, N.Y., assignor to Technicon Chromatography Corporation, Chauncey, N.Y., a corporation of New York Application May 23, 1957, Serial No. 661,118

16 Claims. (Cl. 141—130)

The present invention relates to an apparatus for collecting predetermined volumes of liquids which issue in drop form from a source thereof.

The present invention is especially useful in an automatic fraction collection apparatus of the type shown in Patent No. 2,710,715 to George Gorham, dated June 14, 1955, and assigned to the assignee hereof. Said patent provides for obtaining predetermined quantities of liquid issuing in drop form from a chromatography column, or the like, and as shown therein, a predetermined quantity of the liquid is collected in each of a plurality of receptacles or containers. Said quantities may be determined, as provided in said patent, by counting the number of drops which issue from the chromatography column or by permitting each receptacle to receive drops for a predetermined period of time. Due to the fact that the drops issuing from the chromatography column may vary in volume, it is possible that there may be some differences in the volumes of the liquid collected in each of the receptacles whether the drop counting or the time counting arrangement is used. Under certain circumstances, it may be highly desirable, or even critical, that an extremely exact amount of liquid be collected in each of the receptacles. Consequently, it is an object of the present invention to provide a highly novel apparatus for collecting with great accuracy the same amount of a drop-falling liquid in each of a plurality of receptacles.

It is another object of the present invention to provide apparatus for measuring the volume of liquid collected in each of the receptacles of a fraction collector or the like, so as to provide an equal volume of liquid in each of the receptacles.

Another object is the provision of a highly novel and highly accurate device for collecting drops by volume rather than by counting the drops or on a time relationship.

The above and other objects, features and advantages of the present invention will be more fully understood from the following description considered in connection with the accompanying illustrative drawings.

In the drawings, which illustrate the best mode presently contemplated of carrying out the invention:

Fig. 1 is a combined block diagram and schematic representation of an apparatus pursuant to the present invention;

Fig. 1A is a more or less schematic view of part of the apparatus of Fig. 1; and Fig. 2 is a series of wave forms utilized in the explanation of said apparatus.

As here shown, the drop-volume measuring apparatus 10 is utilized in connection with chromatography column 11 of conventional construction, provided with an outlet 12 through which liquid, in the form of drops, issues after passing through adsorbent substance 14 provided in the column. Provision is made for a light source 16 from which light passes through an aperture 18 provided in a suitable light shield 20, the light being formed into a beam 22 by said aperture. The beam of light 22 is focused by the lens 24 onto a photo-sensitive device or photo tube 26. The beam 22 passes below the outlet 12 of the column 14, passing across the fall or drop path of the drops of liquid issuing from the outlet 12. Consequently, it will be apparent that a drop passing through the drop position D1 will intercept the light beam 22 passing to the photo-electric device 26.

The interception of the beam 22 by a drop at position D1 will cause a pulse 28 (Fig. 2) to be generated in the output of the photo-tube 26 which pulse is fed to the amplifier 30. Three conventional and well known delay-circuit stages 32, 34 and 36 which, for example and not by way of limitation, may be suitable multivibrators, are connected in parallel across the output of the amplifier 30, each of which stages is simultaneously triggered by an amplified pulse 28 at the output of the amplifier 30. The delay circuits 32, 34 and 36 are similar in construction but each provides a different delay period. Delay circuit 32 provides a minimum delay period which is equal to the time T2 minus T1, as shown in Fig. 2, the delay circuit 34 providing an intermediate delay which is equal to time T4 minus T1, and the delay circuit 36 providing a maximum delay which is equal to time T6 minus T1. The delayed pulse 38, at the output of delay circuit 32, is utilized to trigger a driven sweep circuit 40. The driven sweep circuit 40 is of conventional construction and, as is well known to those skilled in the art, provides a voltage which is linear with respect to time. The output of circuit 40 is fed, as a horizontal sweep voltage, to the cathode ray camera tube 42. For each pulse 38 used to trigger the driven sweep circuit 40, there is provided one horizontal sweep in the camera tube 42.

In addition to the previously noted light source 16, there is provided an additional light source 44 whose rays pass through a diffusing glass 46 and through the aperture 48 in a light shield 50 to form the beam 52. The beam 52 passes through a collimating lens 54 and through a focusing lens 56 onto the face of a conventional camera tube 42. The beam of light 52 is positioned below the light beam 22 and also traverses the drop or fall path of the drops of liquid issuing from the outlet 12 so that each drop, as it passes through the position D2, intercepts the light beam 52. It will be apparent that whenever a drop falling from column 11 intercepts the light beam 52, the drop is imaged on the face of the camera tube 42. A conventional high voltage and low voltage power supply for the camera tube 42 is indicated by the reference numeral 58. The delay introduced by the delay circuit 32 is timed in relation to the time required for the drop to pass from the position D1 to the position D2 thereof, so that the delayed pulse 38 triggers the sweep circuit 40 shortly after a drop in position D2 is imaged on the face of the camera tube 42.

The signal voltage developed by the imaging of the drop on the camera tube 42 is applied to a conventional time comparison circuit 60 which, as is well known to those skilled in the art, provides an output voltage proportional to the time duration of the output signal from the camera tube. More specifically, it will be understood that a substantially spherical drop at position D2 provides a two-dimensional image on the face of the camera tube 42, which produces a square wave pulse 62 at the output of the camera tube 42. Said pulse 62 has a time duration, for example of T3 minus T2, which is proportional to the width of the drop passing through position D2. The square or rectangular pulse 62 is fed to the time comparison circuit which, as previously indicated, is a conventional circuit and provides a voltage or signal output pulse 64 whose amplitude is proportional to the width or time duration of pulse 62.

The output signal pulse 64 of the time comparison circuit 60 is fed to a peak detector stage 66. The peak detector stage is of conventional and well known construction and, as is well known to those skilled in the art, said stage provides an output signal which is proportional to the maximum or peak amplitude of the signal input applied thereto. In other words, the output provided by the peak detector 66 is proportional to the peak voltage of the input signal pulse 64, the peak detector stage 66 being charged to the peak value of the input pulse 64, and being provided with a time constant relationship such that the stage 66 remains charged as its peak value until the stage is discharged. Consequently, it will be apparent that the amplitude of the charge in the peak detector stage is proportional to the width of the drop since said charge amplitude is proportional to the peak amplitude of pulse 64, and said latter peak amplitude being proportional to the width of the drop, as explained above. The wave form 68 indicates the charge in the peak detector stage 66 resulting from the input signal 64, the termination of said wave form, as at 69, indicating the discharge or recycling of stage 66, as hereinafter explained in detail.

The output of the peak detector 66 is utilized to energize a conventional cubing amplifier 70, to provide a voltage output from the latter which is equal to the cube of the voltage charge in the peak detector 66. However, due to the time-constant of the peak detector circuit, it is necessary to delay the application of the peak detector charge to the cubing amplifier until the peak detector is charged to the maximum voltage amplitude of its input signal. In this connection, provision is made for the second delay circuit 34 at the output of the amplifier 30, the delay circuit 34 introduces a delay of time T4—T1 in the feeding of a signal from the amplifier 30 to an input duration circuit 72 for the cubing amplifier 70. The stage 72 is preferably constituted by a conventional one-shot multivibrator which is triggered by the signal pulse provided at the output of delay circuit 34, and provides a pulse having a time duration of time T5—T4, which is the same duration as that illustrated for pulse 84.

A relay coil 74 is connected across the output of stage 72 so that said relay will be energized for the time period T5—T4. The peak detector 66 is connected at the high voltage side thereof to the movable contact 76 of said coil, the associated stationary contact 78 being connected to the high voltage side of the cubing amplifier 70 through the line 80. The peak detector is connected at the other side thereof through the line 82 to the other side of the cubing amplifier 70. Consequently, it will be apparent that upon energization of the relay coil 74 by the output pulse of the duration stage 72 which, as previously indicated, has a width corresponding to T5 minus T4, and a delay corresponding to T4 minus T1, the engagement of the contacts 76 and 78 will be effected for the period T5—T4 to apply the output of the peak detector 66, during said period, to the cubing amplifier 70. As previously indicated, the cubing amplifier 70 is of conventional construction and provides at its output the cubed pulse 84 which has a time duration of time T5 minus T4, which as stated above, is the period during which the relay 74 is energized by the output of the duration stage 72.

As previously indicated, the drops, falling from the outlet 12 of the column 10 into the receptacle 86, are substantially spherical in form and, since the volume of a sphere is proportional to the cube of the radius thereof, the output pulse 84 of the cubing amplifier 70 is proportional to the volume of the associated drop. This will be apparent from the fact that each peak detector output signal, cubed by the cubing amplifier 70, is proportional to the width of the falling drop as imaged on the camera tube 42, the drop width, of course, being proportional to the drop radius.

The cubing amplifier output furnishes the signal voltage for a conventional balancing servo system, generally indicated by the reference numeral 88. As here shown, the cubing amplifier output is developed across the resistors 90 and 92 which, with a slide wire potentiometer 94 connected in parallel therewith, form components of a conventional null-type balancing system. The potential difference appearing between the junction 96, between the resistors 90 and 92, and the tap 98, of the slide wire potentiometer 94, is applied to a conventional servo amplifier 100. The output of the latter is applied, through the terminals 102—102, to one phase winding of a conventional two phase motor 104, the other phase winding of which is energized from a suitable A.C. source connected to the terminals 106—106 thereof. The shaft 108 of the servo motor 104 is coupled to the slide arm 98 through a gear reduction train 110 and, as is well understood by those skilled in the art, the motor 104 continues to operate until the slide arm 98 reaches a position of balance along the slide wire 94, at which there is no potential difference between the junction 96 and the voltage at the tap or arm 98.

The motor shaft 108 is coupled through a uni-directional coupler 112 to a conventional counting device 114. Said counter 114 is a revolution counter of the predetermining type wherein the revolutions of the motor shaft 108 are successively counted, the counts resulting from each pulse output of the cubing amplifier 70 being added to the counts resulting from a prior pulse output thereof. In this connection, it will be understood that the counter 114 counts in only one direction of rotation of the shaft 108 of the servo motor 104 due to the uni-directional coupler 112. As is customary in the described type of counting device 114, the latter has provision to complete a circuit or close a pair of contacts when the successive counts recorded thereon reach a predetermined total. For example, the counter may be provided with a normally de-energized relay coil 115 having a pair of normally open contacts 116—118, and it will be understood that, upon the counter 114 reaching a predetermined total, the relay 115 is energized to close said contacts. From the foregoing, it will be readily apparent that a cubed voltage, proportional to the width of each pulse 62 provided at the output of the camera tube 42, is recorded as a count on the counter 114, the number of revolutions or counts of the latter for each pulse being proportional to the cube of the pulse and, consequently, to the volume of the drop whose image provided the corresponding pulse.

As previously indicated, the peak detector stage 66 retains a charge representative of each drop passing the camera tube until said peak detector stage is relieved of the charge. Furthermore, in order to effect the described counting operation for each pulse 84, the servo motor 104 must be returned to its zero position after each operation thereof to effect a count. Consequently, in order both to discharge the voltage developed in the peak detector and to return the servo motor 104 to its zero position, the apparatus must be recycled after each drop has passed through the position D2 and before the following drop passes through the position D1. In this connection, it will be noted that drops issue from the outlet 12 of the chromatography column 10 at relatively long time intervals, for example and not by way of limitation, there may be intervals of two or three minutes between drops.

In order to recycle the apparatus, the peak detector 66 is shorted, at the outlet side thereof, after each counting operation. In this connection as previously indicated, the original pulse 28 developed by the photo-sensitive device 26 is also applied to the third delay stage 36. The delay provided by the stage 36 is equal to the time T6 minus the time T1. A relay coil 128 is connected across the output of the delay stage 36. The relay 128 has a movable contact 130 connected to the lead 82 and a stationary contact 132 which is connected to the movable contact 76 of the relay 74.

The closing of the contacts 76 and 78 initiates a pulse signal applied by the peak detector 66 to the cubing amplifier 70, the amplitude of said pulse being proportional to the width of the drop, as previously explained. A recycling pulse is provided by the third delay circuit 36 which provides an output pulse, having a delay period of T6 minus T1, to the relay 128 to close the contacts 130—132 thereof for shorting the peak detector 66, as indicated at 69 on the wave form 68. In addition to shorting the output of the peak detector 66, the closed contacts short the input to the cubing amplifier 70, causing output to the servo amplifier to be cut off to unbalance the bridge constituted by resistors 90, 92 and 98, and the servo motor 104 operates in the opposite direction to return to its zero position. However, due to the unidirectional coupler 112, said opposite rotation of the shaft 108 does not result in a count being recorded on the counter 114.

The closing of the relay contacts 116 and 118 is utilized to remove the filled container 86, which now has a predetermined volume of the liquid, from under the outlet 12 and to replace the container 86 with another container preferably utilizing the fraction collector apparatus disclosed in the previously identified Patent No. 2,710,715, and generally indicated herein by the reference numeral 156. More specifically, in said prior patent, provision is made to periodically energize a rack moving motor 288 under the control of a counting device, the schematic wiring diagram of which is indicated by the reference numeral 592 in Fig. 31 of said patent. As illustrated in Fig. 1A the rack 289 is rotated intermittently by the engagement of pin 291 with the toothed edge 293 of the rack as described in said Patent No. 2,710,715. Pin 291 is rotated by the shaft 295 of motor 288 through the gearing 297. In accordance with the present invention the drop volume measuring apparatus 10 is utilized in lieu of the drop counting device 592 of said patent to provide a predetermined volume of liquid in each of the containers 86. The circuitry utilized in connecting the drop volume measuring apparatus 10 of the present invention to the main control unit 562 of the automatic fraction collection apparatus, as shown in Fig. 31, includes the relay coil 134 one end of which is connected to contact 118 through an RC network constituted by the capacitor 136 and a resistor 138. The other end of the relay 134 is grounded. When the counter 114 reaches a predetermined count, as explained above, the contacts 116 and 118 close and the RC network 136—136 is charged by the potential source to provide a positive potential for energizing the relay 134. The latter is provided with a movable contact 140 and a companion stationary contact 142. The movable contact 140 is connected to one end of a relay coil 144 and to a stationary contact 146 of said coil.

The terminal strip 598 of said prior patent is illustrated by the similarly numbered terminal strip herein and the various terminals shown herein and parts extending to the right of said terminals represent the correspondingly or similarly numbered parts or components of the fraction collector apparatus 156 of said prior patent. The stationary contact 142 is connected to the terminal 608 of said terminal strip 598 and the other end of the relay 144 is connected through the lead 148 to the terminal 606. The movable contact 150 of said relay 144, companion to the stationary contact 146 thereof, is connected to the terminal 612. A second movable contact 152 of said relay is connected to the terminal 614 and a stationary contact 154, companion to said contact 152, is connected to the terminal 608. With the control switch 580 of the automatic fraction collection apparatus 156 in the illustrated condition thereof to provide an equally measured volume of liquid in each container 86, the contact 142 of relay 134 is connected through the terminal 608 and closed switch section 508B to one power terminal 564, the relay 144 being connected through the line 148, the terminal 606 and the closed switch section 508A to the other power terminal 572. The unit motor 288, which is intermittently operated to intermittently rotate the container holding rack of the automatic fraction collection apparatus 156, is connected between the terminal 614 and the power terminal 572. The reset switch 364, of the automatic fraction collection apparatus, is connected between the terminals 608 and 612.

Assuming now that a predetermined count has been reached by the counter 114, the contacts 116, 118 thereof will close to charge the RC network 136—138 to energize the relay 134. This closes the contacts 140—142 thereof and completes a circuit between one side of the relay 144 and the power terminal 564, the other side of relay 144 being connected to the power terminal 572. Energization of the relay 144 results in the closing of the contacts 146—150 thereof to provide a holding circuit for retaining said relay 144 in energized condition after the de-energization of the relay 134 due to the decrease in charging current through capacitor 136. It will be noted that the holding circuit for the relay 144 includes the closed reset switch 364. Energization of the relay 144 also closes its contacts 152—154 to complete the energizing circuit for the motor 288 through the contacts 152—154 to the power terminal 564. The motor now operates to rotate its rack to move the filled receptacle or container 86 from beneath the outlet 12 and to replace the filled container with an empty container positioned under said outlet, as fully illustrated and described in said patent. Shortly before the motor has completed its movement, the reset switch 364 is operated by a cam driven by the motor, as fully illustrated and described in said patent, to open the switch 364 for interrupting the holding circuit of the relay 144 to de-energize the latter and to open the paired contacts thereof.

Consequently, it will be readily apparent that the apparatus 10 may be utilized to provide an equally measured volume of liquid in each container 86 of the fraction collector 156, to provide a highly accurate equal volume or fraction of the liquid in each receptacle or container of the fraction collector.

While I have shown and described the preferred embodiments of my invention, it will be understood that various changes may be made in the idea or principles of the invention within the scope of the appended claims.

Having thus described my invention, what I claim and desire to secure by Letters Patent is:

1. Apparatus for measuring the volume of one or more falling drops of liquid comprising means for providing a falling drop of the liquid, means operable in response to the fall of the drop in relation thereto to provide a voltage proportional to the width of a drop, means to cube said voltage, and means to measure said cubed voltage whereby to provide a measurement proportional to said volume.

2. Apparatus for measuring the volume of a drop of liquid comprising means to provide a voltage proportional to the width of said drop, means for directing a series of liquid drops in succession in operative relation to said voltage providing means for controlling the operation of the latter for generating the voltage, means to cube said voltage, and means to measure said cubed voltage whereby to provide a measurement proportional to said volume, said measuring means comprising means to provide a count proportional to said cubed voltage, means to receive one or more drops of the liquid, and means operable under the control of said measuring means for controlling the volume of liquid delivered to said receiving means.

3. Apparatus for measuring the volume of one or more drops of liquid comprising means to provide a voltage proportional to the width of a drop, means for directing a series of liquid drops in succession in operative relation to said voltage providing means for controlling the operation of the latter for generating the voltage, means to cube said voltage, and means to measure said cubed voltage whereby to provide a measurement proportional to said volume, said measuring means comprising a servo system responsive to said cubed voltage, and a counter device operable by said servo system, means to receive one or more drops of the liquid, and means operable under the control of said measuring means for controlling the volume of liquid delivered to said measuring means.

4. Apparatus for measuring the volume of one or more drops of liquid comprising means to provide a voltage proportional to the width of a drop, means for directing a series of liquid drops in succession in operative relation to said voltage providing means for controlling the operation of the latter for generating the voltage, means to cube said voltage, and means to measure said cubed voltage whereby to provide a measurement proportional to said volume, said measuring means comprising a servo system responsive to said cubed voltage, a cumulative counter device operable by said servo system, a normally de-energized work-control circuit, and means for energizing said circuit in response to a predetermined cumulative count attained by said counter device.

5. Apparatus for measuring the volume of a drop of liquid comprising means to provide a voltage proportional to the volume of said drop, said means comprising optical-electrical means and means for imaging said drop on said optical-electrical means for generating said voltage, and means operable under the control of said voltage to provide a measurement proportional to said volume.

6. Apparatus for measuring the volume of a drop of liquid comprising, camera tube means, means to image the drop on said camera tube means to provide an output signal from said camera tube means proportional to the width of the drop image, means to cube said output signal to provide a signal which is proportional to the volume of the imaged drop, and means to effect a measurement of said cubed signal.

7. Apparatus for measuring the volume of a drop of liquid comprising, camera tube means, means to image the drop on said camera tube means to provide an output pulse from said camera tube means having a time-duration proportional to the width of the drop image, a time comparison circuit at the output of said camera tube and operable to provide a pulse having a magnitude proportional to the width of said first mentioned pulse, means to provide an output voltage having a magnitude which is the cube of the magnitude of said second mentioned pulse, and means to effect a measurement of said last mentioned output voltage.

8. Apparatus for measuring the volume of a drop of liquid comprising, camera tube means, means to image the drop on said camera tube means to provide an output pulse from said camera tube means having a time-duration proportional to the width of the drop image, a time comparison circuit at the output of said camera tube and operable to provide a pulse having a magnitude proportional to the width of said first mentioned pulse, a peak detector circuit at the output of said time comparison circuit to provide a voltage output at the peak value of said second mentioned pulse, and means to effect a measurement of said last mentioned output voltage.

9. Apparatus for measuring the volume of a drop of liquid as the drop falls through space, said apparatus a camera tube, a normally de-energized driven-sweep circuit operable when energized to provide a single sweep on the face of said camera tube, photo-electric means in circuit with said sweep circuit through a delay circuit interposed therebetween, means to focus a light beam on said photo-electric device for interception by a falling drop to energize said sweep circuit after a delay predetermined by said delay circuit, means to image the falling drop on said camera tube after interception of the light beam, said sweep circuit being energized substantially when the drop is imaged on said camera tube to provide at the output of the latter a pulse having a time duration proportional to the width of the drop image, a time comparison circuit at the output of said camera tube and operable to provide a pulse having a magnitude proportional to the width of said first mentioned pulse, means to provide an output voltage having a magnitude which is the cube of the magnitude of said second mentioned pulse, and means to effect a measurement of said last mentioned output voltage.

10. Apparatus for measuring the volume of a drop of liquid as the drop falls through space, said apparatus a camera tube, a normally de-energized driven-sweep circuit operable when energized to provide a single sweep on the face of said camera tube, photo-electric means in circuit with said sweep circuit through a delay circuit interposed therebetween, means to focus a light beam on said photo-electric device for interception by a falling drop to energize said sweep circuit after a delay predetermined by said delay circuit, means to image the falling drop on said camera tube after interception of the light beam, said sweep circuit being energized substantially when the drop is imaged on said camera tube to provide at the output of the latter a pulse having a time duration proportional to the width of the drop image, a time comparison circuit at the output of said camera tube and operable to provide a pulse having a magnitude proportional to the width of said first mentioned pulse, a peak detector circuit at the output of said time comparison circuit to provide a voltage output at the peak value of said second mentioned pulse, a cubing amplifier circuit at the output of said peak detector circuit, said cubing amplifier being normally disconnected from said peak detector circuit, means including a second delay circuit energized by said photo-electric means and providing a delay greater than said first mentioned delay to connect said cubing amplifier to said peak detector for a predetermined period after the latter is charged to the peak value of said second mentioned pulse, and means to effect a measurement of the output voltage of said cubing amplifier circuit.

11. Apparatus as set forth in claim 10, further characterized in that provision is made for means including a third delay circuit energized by said photo-electric device and operable after a delay period greater than said second delay period to discharge said peak detector circuit.

12. Apparatus as set forth in claim 10, further characterized in that said measuring means comprises a null type measuring circuit which includes a servo-motor and a counter having a uni-directional coupling with said motor, and provision is made for means including a third delay circuit energized by said photo-electric device and operable after a delay period greater than said second delay period to discharge said peak detector circuit and to zero said motor.

13. Apparatus of the character described, comprising a device provided with a material discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, and material volume-measuring means for determining the rest period of said container-supporting means between the intermittent movements thereof, said material being discharged in drops and said volume-measuring means operable to measure the volume of each drop and to accumulate said measurements to provide a count of the material discharged into the container.

14. Apparatus of the character described, comprising a device provided with a material discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, and material volume-measuring means for determining the rest period of said container-supporting means between the intermittent movements thereof, said material volume measuring means comprising means to measure directly the volume of the material discharged from said outlet into each container.

15. Apparatus of the character described, comprising a device provided with a material discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, and material volume-measuring means for determining the rest period of said container-supporting means between the intermittent movements thereof, said material being discharged in drops and said volume-measuring means operable to measure the volume of each drop and to accumulate said measurements to provide a count of the material discharged into each container, and switch means in circuit with said volume-measuring means and operable in response to the receipt of a predetermined volume of material in the container in said position to energize said moving means to terminate said rest period.

16. Apparatus of the character described, comprising a device provided with a material discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, and material volume-measuring means for determining the rest period of said container-supporting means between the intermittent movements thereof, said material volume measuring means comprising means to measure the volume of each drop of material discharged from said outlet, and means to add the drop-volume measurements to provide a predetermined total drop-volume measurement for each container.

References Cited in the file of this patent
UNITED STATES PATENTS

| | | |
|---|---|---|
| 2,710,715 | Gorham | June 14, 1955 |
| 2,750,110 | Och | June 12, 1956 |
| 2,809,784 | Brook | Oct. 15, 1957 |